(12) United States Patent
Gang

(10) Patent No.: US 6,911,070 B2
(45) Date of Patent: Jun. 28, 2005

(54) FLAME INHIBITING AND RETARDING CHEMICAL PROCESS AND SYSTEM FOR GENERAL USE ON MULTIPLE SOLID SURFACES

(76) Inventor: Henry Gang, 42 Leighton Ave., Yonkers, NY (US) 10705

(*) Notice: Subject to any disclaimer, the term of this patent is extended or adjusted under 35 U.S.C. 154(b) by 0 days.

(21) Appl. No.: 10/457,325

(22) Filed: Jun. 9, 2003

(65) Prior Publication Data

US 2004/0035318 A1 Feb. 26, 2004

Related U.S. Application Data

(62) Division of application No. 09/492,482, filed on Jan. 27, 2000, now Pat. No. 6,613,391.

(51) Int. Cl.[7] .......................... C09K 21/04; C09K 21/12
(52) U.S. Cl. ................ 106/18.14; 106/18.15; 106/18.16; 252/601; 252/606; 252/607; 252/609
(58) Field of Search .................. 106/18.14, 18.15, 106/18.16; 252/601, 606, 607, 609

(56) References Cited

U.S. PATENT DOCUMENTS

| | | | | |
|---|---|---|---|---|
| 4,232,135 A | * | 11/1980 | Bentley et al. | 525/509 |
| 4,247,435 A | * | 1/1981 | Kasten | 523/179 |
| 4,699,824 A | * | 10/1987 | Pufahl | 428/220 |
| 4,740,527 A | * | 4/1988 | von Bonin | 521/105 |
| 4,985,307 A | * | 1/1991 | Kobayashi et al. | 428/413 |
| 5,047,449 A | * | 9/1991 | Pastureau | 523/179 |
| 5,156,775 A | * | 10/1992 | Blount | 252/609 |
| 5,401,793 A | * | 3/1995 | Kobayashi et al. | 524/401 |
| 5,556,033 A | * | 9/1996 | Nachtman | 239/343 |
| 5,665,499 A | * | 9/1997 | Dan et al. | 430/49 |
| 5,723,515 A | * | 3/1998 | Gottfried | 523/179 |
| 6,613,391 | * | 9/2003 | Gang | 427/415 |

FOREIGN PATENT DOCUMENTS

| EP | 000570233 A1 | * | 11/1993 |
|---|---|---|---|
| GB | 2220664 A | * | 1/1990 |

OTHER PUBLICATIONS

Derwent Abstract No. 2003–595379, abstract of Russian Patent Specification No. 2208028C1 (Jul. 2003).*

* cited by examiner

Primary Examiner—Anthony J. Green

(57) ABSTRACT

A process for an aqueous liquid flame retardant and fire quenching and extinguishing product for various and diverse materials with wide ranging chemical affinity. Preparations are safe, non-toxic, for professional and household use, in a stable colloidal dispersion. Mixtures include a base comprised a source of phosphoric acid, a charring agent, and a blowing agent. Products can be used with conventional manual and household spraying means, and have long shelf life and stability.

8 Claims, 2 Drawing Sheets

FIGURE 2

SUBSTRATE-RETARDANT INTERACTIONS

| A | B |
|---|---|
| Ionic<br>Ion-dipole | Formation of a primer-like surface and suppression of ionization of retardant by alkaline resin |

FLAME INHIBITING AND RETARDING CHEMICAL PROCESS AND SYSTEM FOR GENERAL USE ON MULTIPLE SOLID SURFACES

This application is a divisional of Ser No. 09/492,482, filed Jan. 27, 2000 now U.S. Pat No. 6,613,391.

The present invention relates to a process for flame- and fireproofing surfaces, substrates, and materials of various and diverse composition, comprising natural, synthetic and metallic materials. The invention relates more particularly to the readily achievable application of an intumescent fire- and flame retarding composition to coat smooth, non-porous, as well as porous surfaces. The invention further discloses a novel fire- and flame retarding composition based on dissolving soluble materials dispersing and suspending insoluble materials colloidally in a water-based formulation, and further describes procedures for modifying the polarity of said flame retarding composition, where needed, to achieve the desired coating effect on synthetic and metallic surfaces. Furthermore, the composition herein disclosed comprises non-toxic materials.

BACKGROUND OF THE INVENTION

Prior Art

In the prior art it is almost always specified what kind of material the retardant is to be applied to, with substantial differences in composition depending on the actual substrate to be protected.

Furthermore, in most cases the materials to be applied are unsafe, toxic or noxious, making them unsuitable for household use or for other purposes which entail human contact or handling; furthermore, their preparation and/or application may entail cumbersome and involved techniques. Presently published fire retardant literature does not disclose the need to keep the fire retardant mixtures in suspension as colloidal mixture to obtain the desired fire protecting quality of a mixture, and to increase and enhance the shelf-life of the product.

Currently there is no single intumescent-based fire-retardant coating material having all of the following features:
1. a coating material allowing ease of application by spraying, brushing, roller application, or the like; and,
2. a coating material maintaining its consistency over time and keeping all of its components perfectly mixed and blended with one another in a colloid state; and,
3. a coating material that can be applied with minor variations to a large variety and diversity of substrates;
4. a coating material comprising non-toxic or minimally toxic ingredients;
5. a coating material that is suspended in a water based solvent to be non-toxic or having no toxicity when applied, after curing on all kinds of surfaces, including wood, plastics, sheetrock, toys, formica, rubber, etc.; and,
6. a coating material providing a low rate of thermal transmission, especially where low weight is critical, such as in aircraft and ships;
7. a coating material drying quickly and efficiently;
8. a coating material with good adhesion and stability.
9. a coating material for home and non-professional use.
10. a coating material for incorporation and application in building materials and structures.

None of the so-far disclosed flame retardant compositions teach the process and principles outlined in the present application. U.S. Pat. No. 4,198,328, issued to Bertelli, discloses flame-resisting paints obtained by reacting aldehydes with compounds containing amido, carbonyl (>C=O), and >C=S containing compounds inserted in a cyclic structure, or reaction products from aliphatic or aromatic diisocyanates or triisocyanates with organic compounds having reactive hydrogen atoms. U.S. Pat. No. 4,224,374, issued to Priest, discloses a non-flammable impregnant for polyether-derived polyurethane foam substrates, characterized by a carboxylated neoprene latex and alumina trihydrate. U.S. Pat. No. 4,370,442, issued to Pearson, discloses an aqueous resinous system produced by reacting an aldehyde with phosphoric acid, and adding an alkanolamine, urea, and melamine in aqueous solution. U.S. Pat. Nos. 4,380,593 and 4,740,527 issued to Von Bonin, disclose intumescent products obtained by a complex reaction sequence employing polyisocyanates as starting materials. U.S. Pat. No. 4,663,228, issued to Vajs et al., discloses a flexible coating providing protection up to 1000 * C, obtained in two stages; a first stage produces an intumescent foam layer and the second relies on vitrification of an agent carried in the intumescent layer, preferably a silicic base. U.S. Pat. Nos. 4,879,320 and 4,963,296, issued to Hastings, disclose a fluid intumescent film-forming binder such as polyvinyl acetate, acrylic resin, vinyl acrylic resin, silicone resin, epoxy or polyurethane, or combinations thereof, that can be rendered electrically conductive by incorporating conductive particles. U.S. Pat. No. 5,401,793, issued to Kobayashi, discloses the use of carbides, borides, nitrides, synthetic resins containing phosphorus and/or sulphur, and other compounds capable of forming Lewis bases on heating. U.S. Pat. No. 5,723,515, issued to Gottfried, discloses a fluid intumescent base material, which additionally includes a binding agent, solvents, and pigment, with the addition of flame spread, oxygen and thermal transmission reducing materials, refractory fibers, mechanical enhancers, water resistant and elasticity agents.

Furthermore, none of the currently disclosed flame retardant composition teaches the use of colloid forming compositions to obtain a stable, paste-like, easy to apply flame suppressant and fire retardant product.

BRIEF DESCRIPTION OF DRAWINGS

FIG. 2 is a summary of the chemical substrate retardant interactions.

OBJECTS, FEATURES, AND ADVANTAGES OF THE INVENTION

Figure 1:
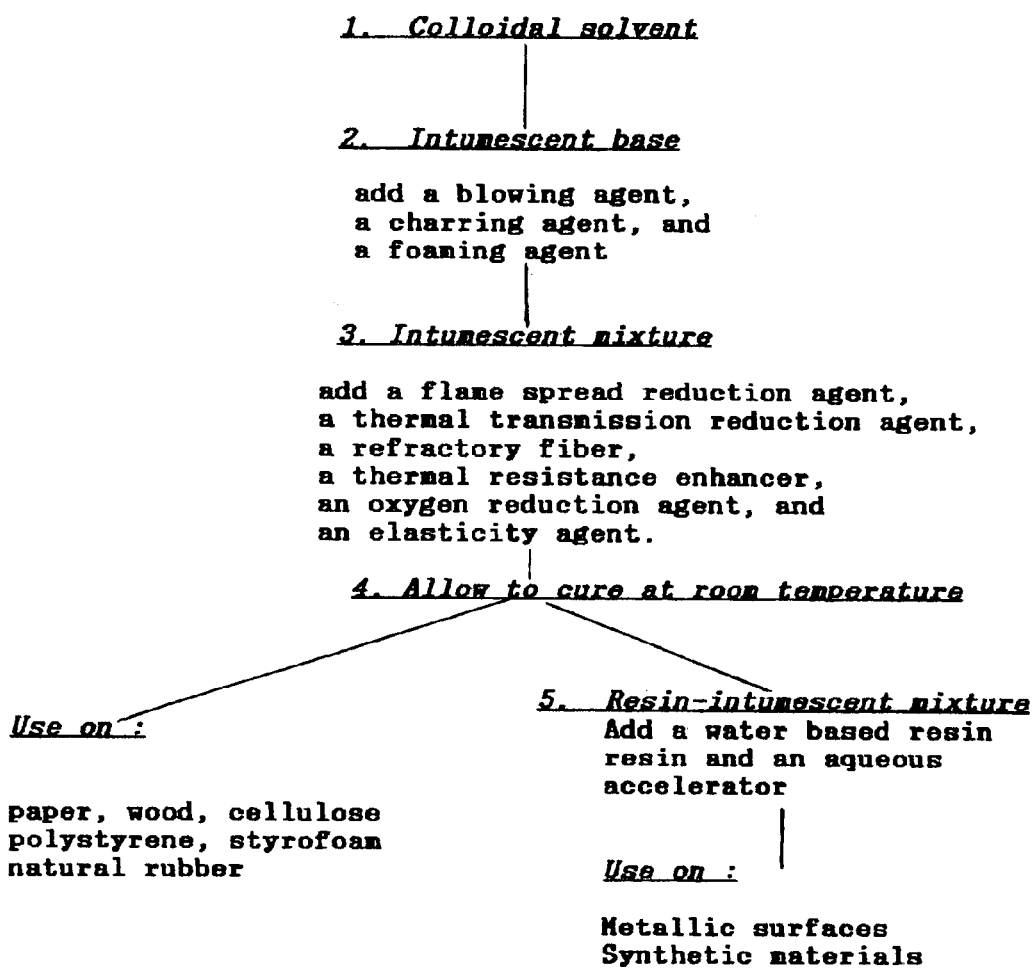
FIG. 1 is a flow diagram of the procedure.

1) In accordance with the above stated needs and the prior art it is the object of the present invention to disclose unique, fire retardant procedures, to apply fire retardant mixtures to a whole variety of solid surfaces, equally effective on wood, paper, styrofoam, polystyrene, rubber tubing, vinyl tubing, PVC tubing, iron, steel, stainless steel, aluminum and other non-ferrous metals, etc.

2) Another object of the present invention is to disclose a flame retardant mixture consisting of an intumescent base comprised of water soluble materials dissolved in a colloidal solution, and water insoluble materials dispersed or suspended in colloidal form in said colloidal solution. The colloidal solution is formed dissolving macromolecular materials—such as carbohydrates and proteins—in water prior to the addition of any further materials. The purpose of colloidally dissolving, dispersing, and suspending materials is to keep the fire retardant mixture evenly distributed, and permanently suspended, thus avoiding precipitation of the insoluble material during storage, application, and providing a uniform flame and fire retardant coating.

Intumescent fire retardant mixtures comprise a source of phosphoric acid, a charring agent, and a blowing agent. Upon exposure to fire, phosphoric acid is generated, which catalyzes the formation of a char layer and the generation of non combustible gases which oppose the supply of oxygen to the fire. The surface char layer both insulates from further thermal degradation and impedes the flow of potentially flammable decomposition products from the interior of the product to the gas phase where combustion occurs. Intumescent mixtures further interfere with the supply of oxygen to the flame by blowing non-combustible gases generated by the fire and flame themselves, thus causing the flame to eventually subside and die.

3) Another object of this invention is to disclose a paste-like, colloidally stabilized, flame retardant mixture, wherein fillers, and elasticity agents such as milled fibers, paper, vermiculite, perlite, and the like, are added to give a paste like consistency to the mixture; said mixture also including fire and heat refractory fibers and materials, flame spread reagents, thermal transmission agents, and oxygen reducing agents, to provide protection at elevated temperatures, as high as 3500–4000 *F.

4) A feature of the present invention is a colloidal fire retardant mixture that can be mixed with a water based resin, that, upon curing at room temperature, with or without addition of an accelerator, adheres to synthetic substrates, previously impervious to the application of the original flame retardant mixture.

5) Another object of the present invention is to disclose a process to apply a replacement fireproofing cementitious compound for steel structures, pipes, etc. fire retardant mixture on a variety of substrate materials, such as wood, plywood, formica, plastics, PVC, rubber, composites, vinyl, styrofoam, sheetrock, ceiling, tiles, etc. Cementitious fireproofing materials are substitutes for asbestos, when asbestos is removed.

6) A further feature of the present invention is to disclose a process to apply a fire retardant materials for use in many industries, such as construction, transportation, utilities, telecommunications, chemical and petroleum manufacturing, aircraft, marine crafts, industrial, domestic and military applications.

7) A further feature of the present invention is to disclose a process using non-toxic products.

ADVANTAGES OF THE PRESENT INVENTION

Accordingly, one of the advantages of the present invention is that it provides for a stable intumescent fire retardant coating composition that is effective on a variety of solid substrates that display different chemical interactions with the fire retardant.

Another advantage of the present invention is that the stability of the intumescent base is made possible by the formation of a thick colloidal mixture which keeps insoluble particles hydrated and suspended in the solution. As a matter of fact, the full stabilization of the mixture requires 3–5 days to take effect.

Another advantage of the present invention is that the applicability of the rather polar intumescent mixture for synthetic and non-polar surfaces is obtained through the application of an alkaline water based resin, which decreases the ionic character and polarity of the mixture. The resin itself, dispersed in the mixture, polymerizes slowly and gradually at room temperature creating a loose molecular network which envelopes the intumescent material. The more polar groups of the resin appear to be turned inwards while the less polar groups of the resin are turned outwards towards the unpolar substrate, thus binding to it by hydrophobic and Van der Waals bonds.

Another advantage of the present invention is that it allows for the addition of colored pigments, so that the paste can be used as paint for decorative purposes in homes, business and industrial settings.

Yet another advantage of the present invention is that is that a similar combination can be used in glues, so that fire retardant glues can be produced.

DRAWINGS

FIG. 1

Flow diagram for the procedures to follow to obtain the flame retardant mixtures of this patent application and apply them to flame- and fireproof substrates and materials, comprising the following steps:

1. Colloidal solvent—dissolving colloid forming agent in water.
2. Intumescent base—adding blowing, charring, and foaming agents.
3. Intumescent mixture—comprising the steps of adding flame spread reduction agents, thermal transmission reduction agents, refractory fibers, temperature protection enhancers, elasticity agents.

These products can be used on paper, wood, cellulose, polystyrene, styrofoam, natural rubber, etc.

4. Resin-intumescent mixture—step a) add accelerator to water-based resin; step b) add resin-accelerator mixture to intumescent mixture.

This product can be used clear metallic surfaces, synthetic materials, and other similar substrates.

FIG. 2

Substrate-retardant Interactions:

A) Ionic, ion-dipole: Interaction between intumescent mixture and natural surfaces, including porous materials, styrofoam and polystyrene.

B) Primer-like surface on substrate under weak alkaline conditions. Weakening of ionization on flame retardant intumescent mixture by the addition of a water-based resin, and formation of an envelope-like lattice, with hydrophilic interior and hydrophobic exterior, by gradual polymerization of the resin. This process modifies the polarity of the intumescent mixture, making the adhesion and coating to the non-polar substrate possible.

SUMMARY OF THE INVENTION

The present invention provides an intumescent, colloidal, fire retardant mixture, comprising an intumescent base material, and other flame and fire retarding and quenching chemical means dissolved or finely dispersed and stabilized in a colloidal solution. This intumescent mixture is further miscible with a water-based resin, which enables the material to be spread and adhere onto a variety of synthetic and metallic substrates, which otherwise would not be chemically compatible with the flame retardant base itself, and thus would reject the fire retardant material.

The combination of the intumescent composition with the first colloid forming solution and with the second water soluble resin produces an unexpected and unsual fire retardant coating. This coating has reasonable affinity for all kinds of solid surfaces, natural, synthetic, and metallic, and allows for uniform application of and coating with a fire retardant mixture on a variety of solid surfaces, both porous and non-porous, natural, synthetic, and metallic. The coating material can be applied onto most solid substrates, such as wood, cellulose, rubber, styrofoam, vinyl, PVC, sheetrock, formica, composite, etc. These materials can thus be used for the fireproofing of cardboard containers, formica based furniture, styrofoam containers and packing materials, ceiling tiles, building walls, ceiling beams, wood poles, and the like.

DETAILED DESCRIPTION OF THE PREFERRED EMBODIMENTS

In the present invention, the preferred embodiments and examples include the following:

Embodiment 1

EXAMPLE 1-1

Colloid dispersing solution (CDS): A colloid dispersing solution is prepared by dissolving 50 g hydroxyethylcellulose (HEC)("CELLOSIZE", Union Carbide) in 1000 g water (5%). The mixture is allowed to clear with occasional stirring.

Intumescent base (IB): To the colloid dispersing solution are added in succession 125 g urea, 125 g melamine, and or amino acid mixtures, 100 g glycerol, and 150 g starch. The volume of the mixture increases to 1500 mL. To maintain the concentration of HEC in the mixture, 25 g of the modified cellulose is added to the mixture. The final amount of HEC in the mixture may therefore reach 7.5–8.0%. If the volume at this point is different, the addition of HEC would be 5% of the volume increase. After thorough mixing, 300 g ammoniumpolyphosphate is added to the mixture.

Intumescent mixture (IM): Then, in the order, the following materials are added under thorough mixing and homogenization: 75 g aluminum hydroxyde, 67.5 g aluminum trioxide, 56.25 g silicone dioxide, 75 g titanium dioxide, 67.5 g zirconium dioxide, 27 g kaolin, and 50 g glass powder.

The mixture is thoroughly mixed and left for 2–3 days before use.

This mixture is coated onto the substrates by brushing, roller, spraying, or any other suitable means to afford fire.

EXAMPLE 1-5

The intumescent base for the mixture is prepared by adding to the colloid dispersing solution 125 g urea, 125 g melamine, 100 g glycerol, and 150 g starch. The volume of the mixture increases to 1500 ml, but no further HEC is added to compensate for the dilution. All other steps of Example 1-1 are followed as described.

EXAMPLE 1-6

The intumescent mixture is prepared by adding to the intumescent base of Example 1-1 300 g ammonium polyphosphate, 75 g aluminum hydroxide, 67.5 g aluminim trioxide, 56.25 g silicone dioxide, 75 g titanium dioxide, and 67.5 g zirconium dioxide. All other steps of Example 1-1 are kept as described.

EXAMPLE 1-7

The intumescent mixture is prepared by adding to the intumescent base of Example 1-1 150 g ammoniumpolyphosphate, 50 g aluminum hydroxide, 45 g aluminum trioxide, 37.5 g silicone dioxide, 50 g titanium dioxide, 45 g zirconium dioxide, 27 g kaolin, and 50 g glass powder. All other steps of Example 1-1 are kept as described.

EXAMPLE 1-8

The colloid dispersing solution is prepared with 3% HEC (30 g per 1000 g water) All other steps of Example 1-1 are kept as described.

EXAMPLE 1-9

The colloid dispersing solution (CDS) and the intumescent base (IB) is prepared as described in Example 1-1. Some of the components of the mixture are insoluble and sediment slowly. The mixture is let stand for a few days, until the sediment settles and the supernatant is clear. The supernatant is separated, and 5–20% w/v of a mixture of 9:1 diammonium phosphate:monoammonium phosphate is dissolved gradually with stirring. The solution is clear. This solution is then used as a flame-quenching spraying fluid for a variety of applications.

EXAMPLE 1-10

The colloid dispersing solution is prepared as described in Example 1-1. Then 20% urea, 10% glycerin, and 15% dextrin are added in sequence, waiting for each following addition step until the previous one has been dissolved. Finally, 10–20% of a mixture of 9:1 diammonium phosphate:monoammonium phosphate is added, making sure that no break-up of the colloid takes place. This solution/dispesrion is used as a liquid flame and fire quenching spraying fluid for a variety of applications.

Embodiment 2

EXAMPLE 2-1

An aliquot of the mixture of Examples 1-1 through 1-8 is further treated as follows:

Resin-intumescent Mixture:

Resin-accelerator mixture (RAM): Aqueous melamine resin (a partially alkylated, partially polymerized hexamethoxymethylol melamine—"AEROTEX 3430") containing 0.5–2% formaldehyde (BF Goodrich Chemicals) is mixed with 3% accelerator (diammonium phosphate or "FREECAT 187" from Freedom Chemicals). After mixing the solution becomes slightly turbid.

Resin-intumescent mixture (RIM): One part RAM is added to 3–5 parts of the intumescent mixture of Example 1-1. It is thoroughly mixed and let stand for 1–2 hours. The mixture is then applied by brushing, roller, spraying, or any other suitable means onto vinyl surfaces, PVC, garden hoses, steel supporting beam, steel structures, metal components, building components (door frames, doors, window and window frames, etc.) for full fire protection and adhesion to the substrates. The polymerization reaction of the melamine, catalyzed by the accelerator, proceeds slowly at room temperature and generates an even, smooth and flexible, adhesive coating on the substrate.

EXAMPLE 2-2

Resinous Intumescent Mixture:

The resin-accelerator mixture is prepared as in Example 2-1. An aliquot of the intumescent mixture as in Examples 1-1 through 1-8. One part of this mixture is added to 2 parts of the intumescent mixture of Example 1. It is thoroughly mixed and let stand for 1–2 hours. The mixture is then applied by brushing, roller, or any other suitable means onto vinyl surfaces, PVC, garden hoses, metal surfaces, etc. for full fire protection. The polymerization reaction of the melamine, catalyzed by the accelerator, proceeds slowly at room temperature and generates an even, smooth and flexible, adhesive coating on the substrate.

EXAMPLE 2-3

An aliquot of the mixture of Example 1 -1through 1-8 is further treated as follows:
Resin-intumescent Mixture:
Resin accelerator mixture: Aqueous melamine resin (partially alkylated trimethoxymethylol melamine—"AEROTEX M3" containing 0.5–2.0% formaldehyde (BF Goodrich) is mixed with 3% accelerator (diammonium phosphate or "FREECAT 187" from BF Goodrich). All other details and steps of the preparation are described in Example 2-1.

EXAMPLE 2-4

An aliquot of the mixture as in Example 1-1 through 1-8 is further treated as follows:
Resin-intumescent Mixture:
Resin-accelerator mixture: Aqueous melamine resin ("AEROTEX 3430" or "AEROTEX M3" from BF Goodrich) containing 0.5–2.0% formaldehyde is mixed with 5% accelerator (as per other examples). All other details and steps of Example 2 are followed as described.

EXAMPLE 2-5

Resin-intumescent mixture: 1 Aliquot aqueous melamine-based resin (as per above examples) is mixed vigorously with 2–5 aliquots intumescent mixture of examples 1-1 through 1-8. To this mixture 3–5% accelerator as per previous examples is added under vigorous mixing. The rest of the procedure is as described in examples 2-1 through 2-4.
Embodiment 3.

EXAMPLE 3-1

A thin coat of a silicone-based primer, such as "SS 4179" (GE Chemicals) is applied onto the substrate by brushing, roller, or any other appropriate method, and let dry, possibly overnight. This treatment produces an intermediate coat over the substrate, onto which the preparation of Examples 1-1 through 1-8 is then applied as described in Example 1.

This treatment causes the intumescent mixture to adhere quite firmly to synthetic and non-porous substrates such as vinyl, PVC, garden hoses, etc., that otherwise would reject any contact with the intumescent mixture.

EXAMPLE 3-2

The treatment of Example 3-1 is enhanced by applying on the intumescent mixture layer an additional coat of aqueous melamin resin, to which accelerator (2–3%) has been added as described in Example 2-1 and 2-2.

SUMMARY OF MATERIALS AND AGENTS USED IN EMBODIMENTS

| Component | % Range by total weight |
|---|---|
| An intumescent mixture including: | |
| A colloid forming solution wherein the solvent is water containing 3–5% of a colloid forming water soluble polymer, preferably derivatized cellulose, a carbohydrate, or a protein. | 25–60% |
| Water soluble and insoluble intumescent base materials, including a foaming agent, a blowing (also oxygen spread limiting reagent) agent and a charring agent; such foaming agent is selected from a group consisting of monoammonium phosphate, diammonium phosphate, and ammonium polyphospate; such charring agent is selected from the group consisting of glycerol, sorbitol, starch, pentaerythritol, dipentaerythritol, dextrin, inositol, amylase, polyalcohols, and polysaccharides; such blowing agent is selected from the group consisting of melamine, urea, dicyandiamide, guanidine, guanidine hydrochloride, glycine, and water soluble short chain aminoacids. | 15–40% |
| Flame spread reduction agents; such as aluminum hydroxyde [Al (OH)3], ammonium orthophosphate, zinc oxide (ZnO), or antimony oxide (Sb2O3). | 1.5–5.0% |
| Thermal resistance enhancer agents, such as kaolin, ground glass. | 1.5–7.0% |
| Thermal transmission reduction and refractory agents, such as zirconium dioxide (ZrO2), titanium dioxide (TiO2), silicone dioxide (SiO2), aluminum trioxide (Al2O3), zinc oxide, milled fibers. | 3–15% |
| Elasticity agents and fillers (glass fibers, vermiculite, perlite, or the like) | 0–10% |
| Polarity modifying agents: water-based resins (melamine-formaldehyde resins, selected from the group consisting of aqueous partially alkylated hexamethoxymethylol melamine, or partially alkylated hexamethoxymethylol melamine containing traces of formaldehyde ("AER0TEX 3430" and "AEROTEX M3" from BF Goodrich or equivalent) | 0–50% |
| Resin polymerization activator (diammonium phosphate, or diammoniumphosphate with hexamethylene diamine) | 0–5% |
| Primer for colloid application (silicone based) - coating | |

APPLICATIONS OF THE PRESENT INVENTION

The fire retardant coating material of the present invention can be used for applications on diverse kinds of solid substrates, both natural, synthetic, and metallic. The product is comprised of an intumescent base and a primer resin. The intumescent base can be used for natural substrates and some synthetic substrates, whereas the intumescent base-primer resin mixture is used on substrates that have low chemical affinity to the intumescent base. The product has no human toxicity.

Natural substrates are cellulose, paper by-products, wood, wood by-products, sheetrock, rubber, metals, etc. Such substrates are the base of building structures and materials, structural building elements, furniture, home furnishings, rubber hoses, ceiling tiles, columns and beams, wood frames, walls, etc.

Synthetic substrates are vinyl, PVC, polystyrene, styrofoam, synthetic rubber, polyvinyl, epoxy, synthetic resins, etc. Such materials are used in the production of hoses, pipes, PVC wrappings, toys, household items, building materials, laboratory and professional items, etc.

The present product can thus be used for fire and flame spread protection in buildings and their supporting structures, both residential, industrial, and public, in building materials, to protect the interior and exterior of walls, supporting structures, metal surfaces, garages, ceilings, hung ceilings, window frames, wood paneling, carpet backing, roofing, attics, electrical wires, furniture, safes, file cabinets, toys and the like. In the transportation industry it can be used to protect both the carriers and transported objects, to protect chemicals and other items transported in styrofoam. In industry it can be used to make tubes and pipes fire retardant, difficult to melt under sustained heat.

In households the product is applied like a paint by brushing or roller, or by spraying. In industrial applications high volume applications are recommended. In the construction industry pretreatment is possible.

What is claimed is:

1. A process for obtaining a liquid colloidal soluble fire and flame retardant and inhibiting mixture for natural and porous synthetic substrates comprising the steps of:
    a) mixing , as first step, 3–8% derivatized cellulose in water to obtain a colloidal solvent; and,
    b) adding 15–40% of a charring agent, and of a blowing agent to the colloidal solvent, to obtain an intumescent base; and,
    c) allowing insoluble components of the intumescent base to sediment and collecting a supernatant; and,
    d) dissolving a source of phosphoric acid in the supernatant, to obtain a flame-quenching mixture.

2. The process of claim 1 wherein:
    a) said derivatized cellulose comprises hydroxyethyl cellulose;
    b) said charring agent is selected from the group consisting of glycerin, polysaccharides, pentaerythritol, dipentaerythritol, sorbitol, polyalcohols, and inositol;
    c) said blowing agent is being selected from the group consisting of melamine, dicyandiamide, guanidine, glycine, or water soluble amino acids; and, d) said soluble source of phosphoric acid comprises 10–20% of a mixture of 9 parts diammonium phosphate and 1 part monoammonium phosphate.

3. The process of claim 2, wherein all components are non-toxic to humans.

4. A liquid colloidal soluble fire and flame retardant and quenching mixture produced according to the process of claim 1.

5. A process for obtaining a liquid colloidal soluble fire and flame retardant and quenching mixture for natural and porous synthetic, and metallic substrates and surfaces, comprising the steps of:
    a) mixing, as first step, 3–8% derivatized cellulose in water, to obtain a colloidal solvent; and,
    b) adding gradually and with constant mixing 15–40% of a soluble charring agent, of a soluble blowing agent, and of a soluble foaming agent to said colloidal solvent.

6. The process of claim 5, wherein:
    a) said derivatized cellulose comprises hydroxyethyl cellulose;
    b) said charring agent is selected from the group consisting of glycerin, dextrin, inositol, amylose, sorbitol and water soluble polysaccharides;
    c) said blowing agent is selected from the group consisting of urea, guanidine hydrochloride, and water soluble amino acids; and,
    d) said foaming agent is selected from the group consisting of mono- and diammonium phosphate.

7. The process of claim 6, wherein all components used are non-toxic to humans.

8. A liquid colloidal soluble fire and flame retardant and quenching mixture produced according to the process of claim 5.

* * * * *